United States Patent
Nakaya

(10) Patent No.: US 7,499,642 B2
(45) Date of Patent: Mar. 3, 2009

(54) PORTABLE ELECTRONIC DEVICE AND METHOD OF PREVENTING CLOSE-UP PHOTOGRAPHY BY USING THE PORTABLE ELECTRONIC DEVICE

(75) Inventor: Kimihiko Nakaya, Shizuoka (JP)

(73) Assignee: NEC Corporation, Tokyo (JP)

( * ) Notice: Subject to any disclaimer, the term of this patent is extended or adjusted under 35 U.S.C. 154(b) by 646 days.

(21) Appl. No.: 11/158,847

(22) Filed: Jun. 22, 2005

(65) Prior Publication Data

US 2005/0286879 A1 Dec. 29, 2005

(30) Foreign Application Priority Data

Jun. 28, 2004 (JP) ............................. 2004-189966

(51) Int. Cl.
*G03B 17/00* (2006.01)
(52) U.S. Cl. ............................. 396/263; 396/56; 396/59
(58) Field of Classification Search ................... 396/56, 396/59, 263, 266
See application file for complete search history.

(56) References Cited

U.S. PATENT DOCUMENTS

| 2002/0036836 | A1 | 3/2002 | Hagimori |
| 2002/0039479 | A1 | 4/2002 | Watanabe et al. |
| 2002/0106202 | A1* | 8/2002 | Hunter ........................ 396/56 |
| 2004/0046871 | A1* | 3/2004 | Ichikawa et al. ....... 348/207.99 |
| 2005/0093980 | A1* | 5/2005 | Nonaka et al. ......... 348/207.99 |

FOREIGN PATENT DOCUMENTS

JP 2002-135838 5/2002

* cited by examiner

*Primary Examiner*—W. B. Perkey
*Assistant Examiner*—Warren K Fenwick
(74) *Attorney, Agent, or Firm*—Scully, Scott, Murphy & Presser, P.C.

(57) ABSTRACT

In a portable electronic device with camera, a radio wave detection circuit detects specific radio waves, and when the radio wave detection circuit detects the specific radio waves, a control circuit prohibits close-up photography by a camera.

21 Claims, 11 Drawing Sheets

PORTABLE ELECTRONIC DEVICE AND METHOD OF PREVENTING CLOSE-UP PHOTOGRAPHY BY USING THE PORTABLE ELECTRONIC DEVICE

BACKGROUND OF THE INVENTION

1. Field of the Invention

The present invention relates to a portable electronic device and a method of preventing close-up photography by using the portable electronic device; in particular to a portable electronic device capable of prohibiting proximate photography in close distance to an object in a specific area and a method of preventing close-up photography by using the portable electronic device.

2. Description of the Related Art

In these days, most portable electronic devices such as portable telephone are equipped with a camera. Hereinafter, the description will be made with reference to a portable telephone as an example of the portable electronic device. This portable telephone is provided with functions to store the images taken with a camera mounted on the portable telephone in the main body of the portable telephone, to attach the images to an e-mail to transmit them to other portable telephones and the like. The camera itself mounted on the portable telephone also is now increasingly being highly functionalized. For example, a close-up photography (macro-photography) function is available. In portable telephones, in case of executing proximate photography in close distance to an object in an ordinary photography mode, the image of the object is not brought in focus, resulting in blurred images. However, in the portable telephone, when the close-up photography function is used, even in the event of proximate photography in close distance to the object, the image of the object is brought in focus. Accordingly, the portable telephone is capable of carrying out close-up photography by using the close-up photography function. When the close-up photography function is used, the portable telephone is changed over from the ordinary photography mode to the close-up photography mode. In this case, the portable telephone performs the photography after the changing over to a lens dedicated for close-up photography.

However, with higher functionalization of the camera itself of the portable telephone with camera as described above, various problems arise. For example, there arises an action generally called as "digital shoplifting". The "digital shoplifting" signifies an action, that paper surfaces of a book, magazine or the like, which are sold in a bookstore, convenience store or the like, are photographed without purchasing the book, magazine or the like. In such case, a person who takes the action as described above photographs using a close-up photography function of a portable telephone with camera and by setting the portable telephone to the close-up photography mode (macro-photography mode). Using the close-up photography mode, the portable telephone is capable of photographing the entire paper surface to a larger size. The "digital shoplifting" is becoming a large social problem. As a method of preventing such "digital shoplifting", such a method that a space within the specific area is prevented from photography might be conceivable. Such conventional method is disclosed in, for example, Japanese Patent Laid-open No. 2002-135838. According to the disclosed method, radio waves including a control signal are transmitted into a space in which the photography should be prohibited. And a portable telephone, which has received the control signal, changes its photography mode into the photography-prohibit mode to prohibit the photography.

In the above-mentioned conventional method, the arrangement is made such that the portable telephone, which has received the control signal, changes the photography mode to the photography-prohibit mode. Such being the case, in a space requiring the limit, for example, in the photography-prohibited area, the photography is totally prohibited. Thereby, the "digital shoplifting" can be prevented. On the other hand, the "digital shoplifting" is carried out by photographing by a portable telephone with camera set to the close-up photography mode. Therefore, to prevent the "digital shoplifting", only the close-up photography mode has to be prohibited; but ordinary photography does not have to be prohibited. However, in the above conventional method, to prevent the "digital shopslifting", the photography is totally prohibited in a photography-prohibited area. Therefore, the portable telephone can neither perform the close-up photography, nor ordinary photography in the photography-prohibited area.

SUMMARY OF THE INVENTION

An exemplary feature of the present invention is to prohibit close-up photography while enabling ordinary photography in a photography-prohibited area.

In view of the foregoing and other exemplary problems, drawbacks, and disadvantages, An exemplary portable electronic device, equipped with a camera according to the present invention, includes a radio wave detection circuit that detects specific radio waves, and a control circuit that prohibits close-up photography by the camera, when the radio wave detection circuit detects the specific radio waves.

A method of preventing close-up photography by an exemplary portable electronic device having a camera of the present invention includes: detecting specific radio waves, and when detecting the specific radio waves, prohibiting the close-up photography by the camera.

As described above, the exemplary portable electronic device having a camera of the present invention detects specific radio waves, and when detecting the specific radio waves, prohibits the close-up photography by the camera. Thus, when the exemplary portable electronic device of the present invention is in a bookstore emitting photography prohibition radio waves, the portable electronic device prohibits the close-up photography by receiving the photography prohibition radio waves. However, although the portable electronic device prohibits the close-up photography by receiving the photography prohibition radio waves, but does not prohibit the photography such as ordinary photography or the like other than the close-up photography. Thereby, while allowing the photography other than the close-up photography in a photography-prohibited area such as bookstores emitting the photography prohibition radio waves, "digital shoplifting" can be prevented.

BRIEF DESCRIPTION OF THE DRAWINGS

The objects, features and advantages of the present invention will become apparent from the following detailed description when taken with the accompanying drawings in which.

DETAILED DESCRIPTION OF THE PREFERRED EMBODIMENTS

Now, embodiments of the present invention will be described with reference to the drawings.

Figure 1:
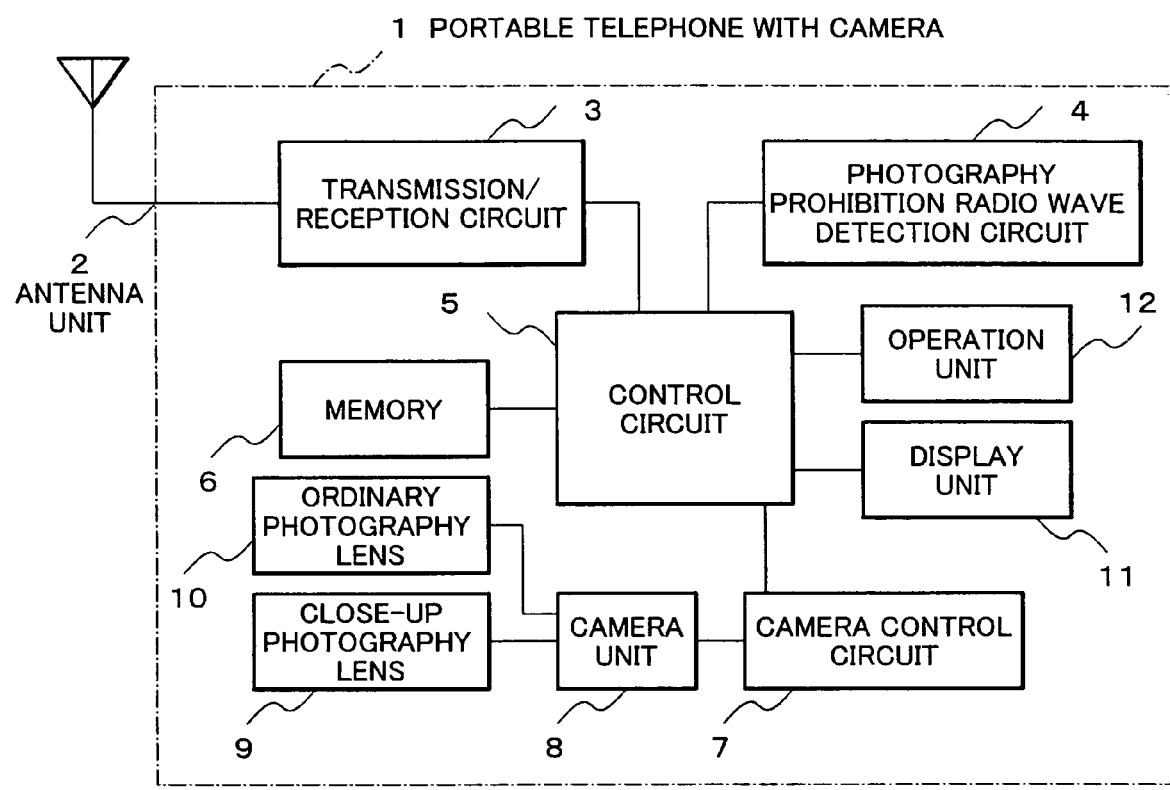
FIG. 1 is a block diagram showing a first exemplary embodiment of a portable electronic device with camera in accordance with the present invention.

FIG. 1 is a block diagram showing a first exemplary embodiment of a portable electronic device in accordance with the present invention. Hereinafter, the following description will be made using a portable telephone with camera 1 as an example of the portable electronic device with camera.

A portable telephone with camera 1 of the first exemplary embodiment has a basic structure including an antenna unit 2, a transmission/reception circuit 3, a control circuit 5, a memory 6, a display unit 11, an operation unit 12 and the like. And further, the portable telephone with camera 1 is provided with a photography prohibition radio wave detection circuit 4, a camera control circuit 7, a camera unit 8, a close-up photography lens 9, and an ordinary photography lens 10.

The antenna unit 2 transmits and receives radio waves between a base station and the same. The transmission/reception circuit 3 modulates transmission data from the control circuit 5 and sends the data to the antenna unit 2, and receives received data from the antenna unit 2 and demodulates the received data.

The photography prohibition radio wave detection circuit 4 includes a receiving antenna and a detection circuit, and detects photography prohibition radio waves, or receives photography prohibition radio waves, and from the received radio waves, detects a predetermined code.

While the photography prohibition radio wave detection circuit 4 is detecting the photography prohibition radio waves, the control circuit 5 causes the camera unit 8 not to perform close-up photography. Or, while the photography prohibition radio wave detection circuit 4 is detecting the predetermined code, the control circuit 5 prohibits the camera unit 8 to perform close-up photography and ordinary photography depending on the content of the code. Further, the control circuit 5 controls the communication by a telephone function, transmission/reception of e-mail and display. Further, the control circuit 5 controls the portable telephone with camera 1 itself based on the instruction from the operation unit 12 and program stored in the memory 6.

The memory 6 stores programs for controlling the operation of the portable telephone with camera 1 and data for personal use of the owner etc of the portable telephone with camera 1. Also, the memory 6 is used as a work area by the control circuit 5.

The camera control circuit 7 instructs the operation of the camera. The camera unit 8 performs camera function in accordance with the instruction by the camera control circuit 7. The close-up photography lens 9 is a lens used for carrying out close-up photography. The focal length of the close-up photography lens 9 is, for example, within a range of approximately 5 cm to 25 cm. It is appropriately determined what value of the lens should be used depending on the type of the portable telephone 1. The ordinary photography lens 10 is a lens used when performing ordinary photography.

The display unit 11 is an LCD or the like for displaying images of an object taken by the camera through the lens, menu showing operation items etc, various kinds of data and the like.

The operation unit 12 is equipped with various kinds of keys for operating the portable telephone with camera 1. Based on the depression of these keys, the control circuit 5 performs input of telephone number, selection of item displayed on the display unit 11 and determination of display.

Next, the operation of the portable telephone with camera of this embodiment will be described in detail with reference to FIGS. 2 to 7.

Figure 2:
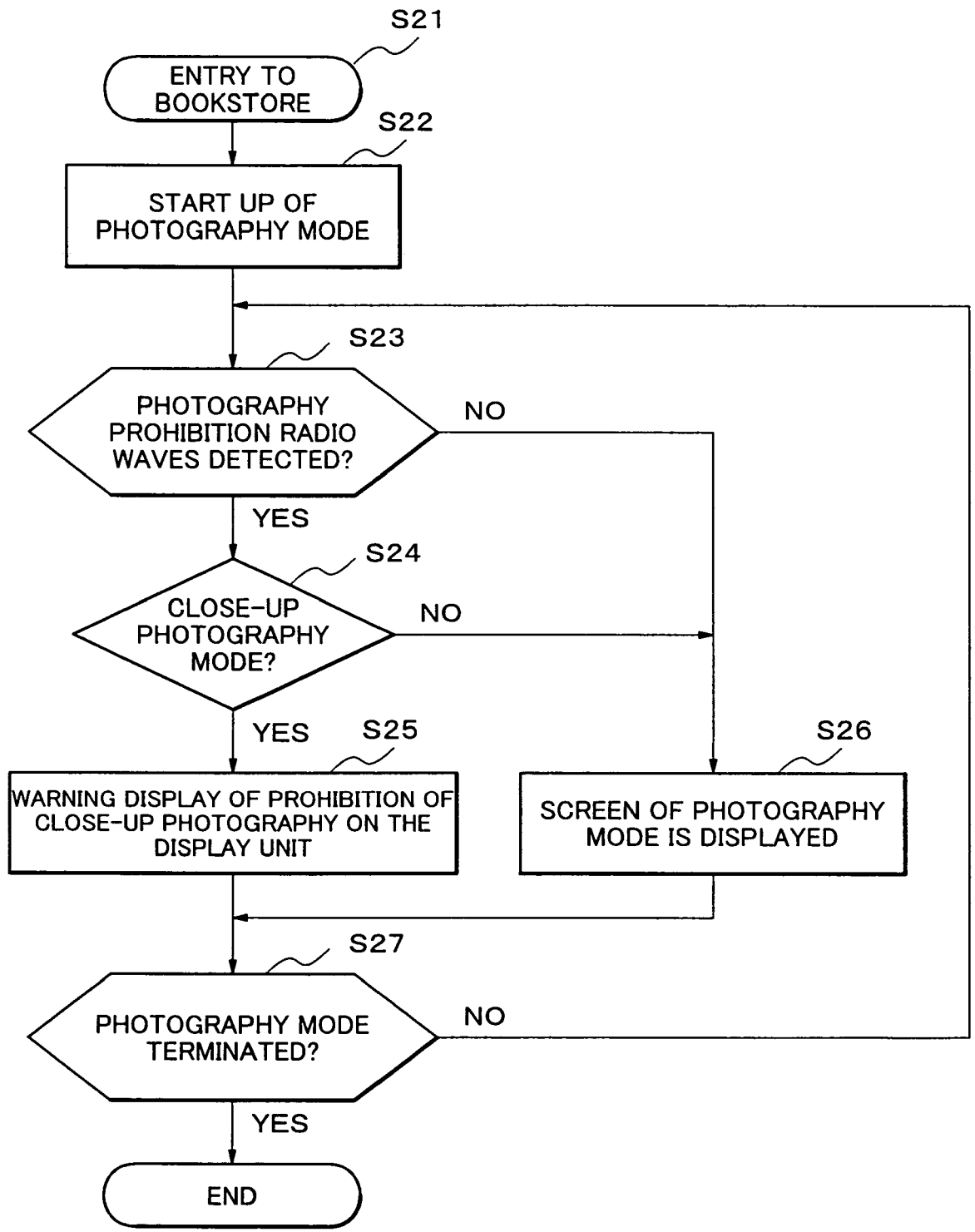
FIG. 2 is a flowchart showing an example of the operation of the first embodiment of the portable electronic device with camera in accordance with the present invention.
Figure 3:
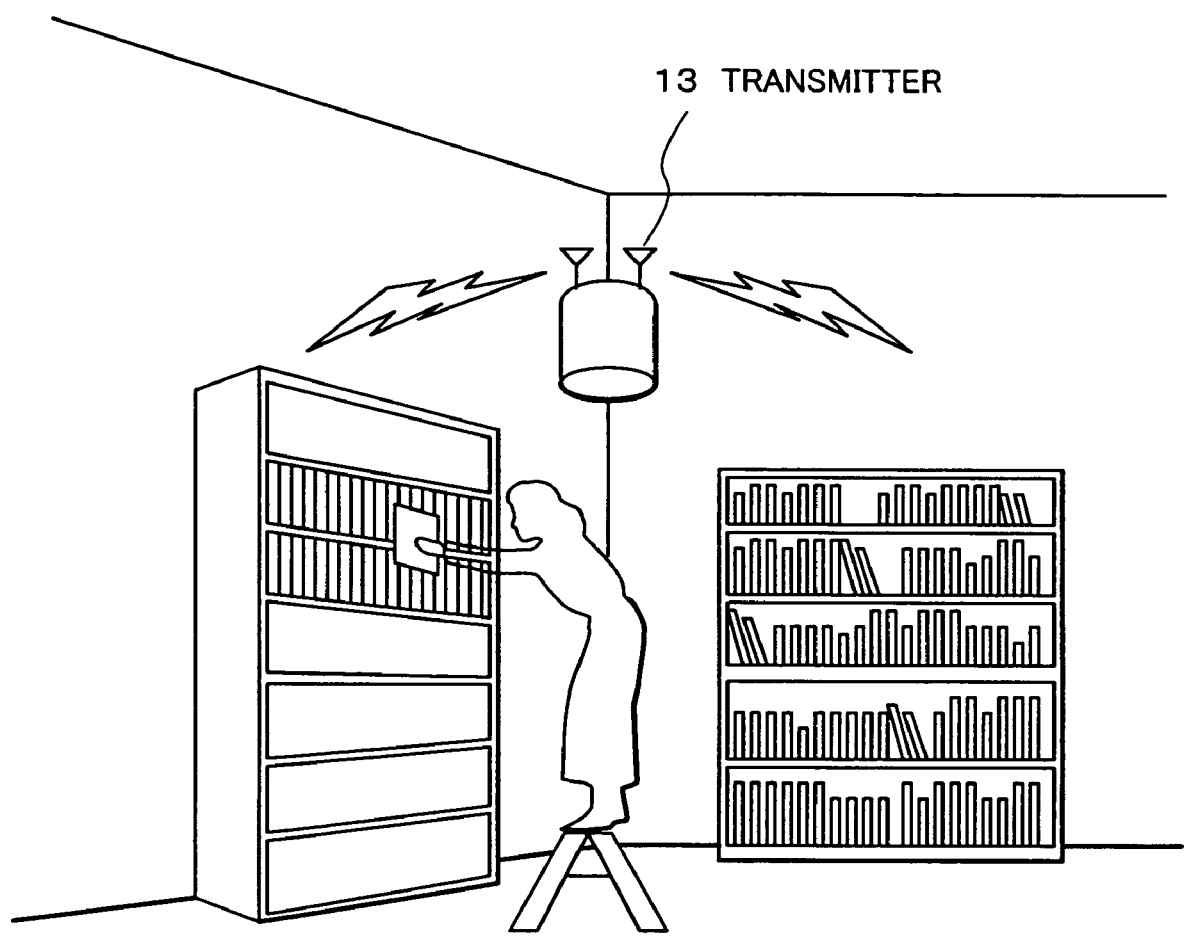
FIG. 3 shows an example of environment equipped with a transmitter for transmitting photography prohibition radio waves.
Figure 4:
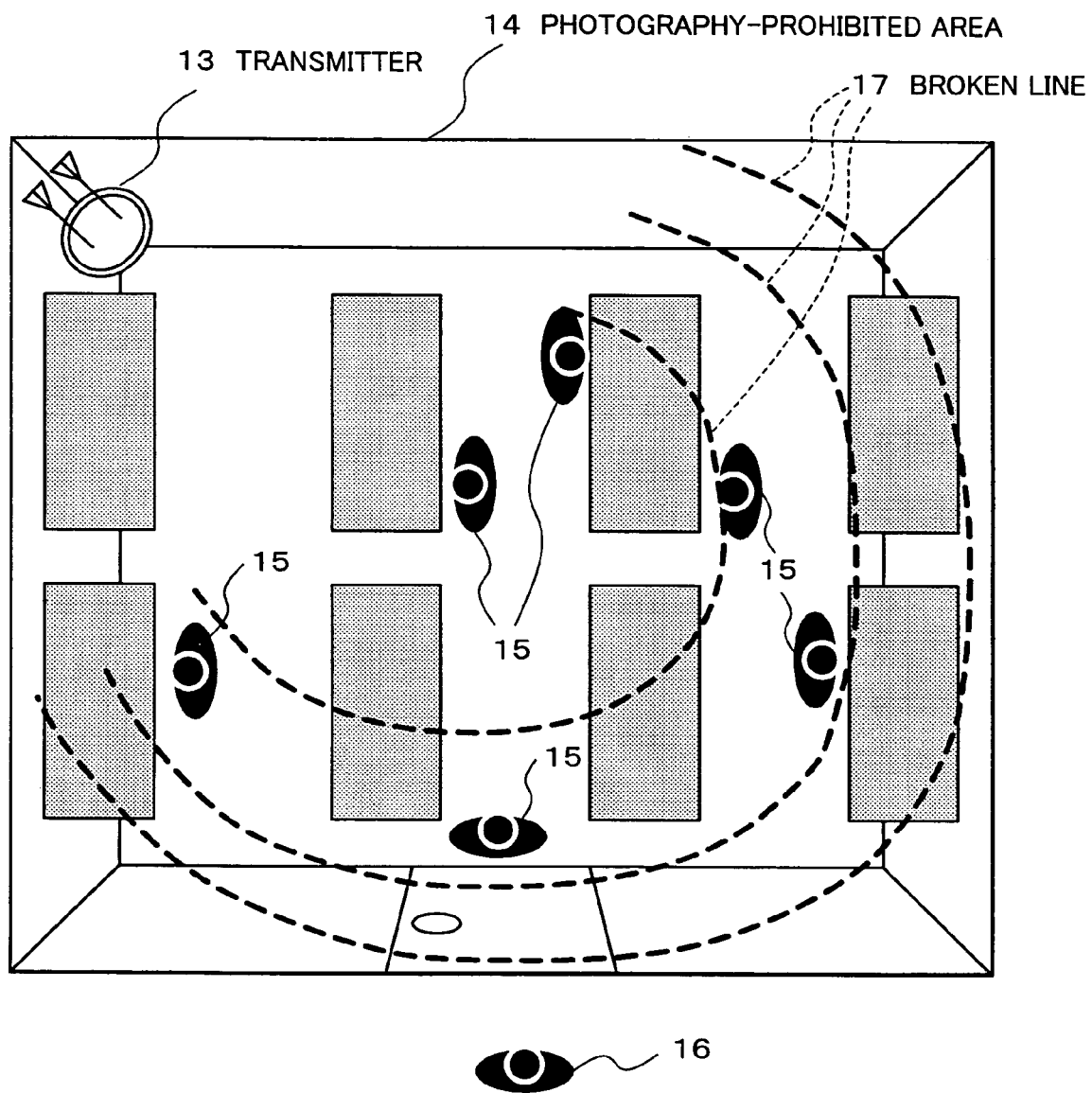
FIG. 4 illustrates an example of a situation under which close-up photography by using a portable electronic device with camera in accordance with the present invention is prohibited.

In step S21 of FIG. 2, a user, who owns the portable telephone with camera 1 shown in FIG. 1, enters a bookstore. As shown in FIG. 3, in the bookstore, bookshelves are placed along the walls. A transmitter 13 is installed on the upper portion at a corner in the store, and transmits photography prohibition radio waves of a specific frequency. As shown in FIG. 4 (top view of the inside of the bookstore), viewing the inside of the bookstore from the direction of its ceiling, as indicated with broken lines 17, the photography prohibition radio waves from the transmitter 13 propagate to the area within the bookstore and covers the inside of the bookstore. There are six portable telephones with camera in the bookstore and one outside the bookstore (figures indicated with black ellipses). That is, it is illustrated that, there are six users of the portable telephone with camera 15 in the bookstore, and one user of a portable telephone with camera 16 outside the bookstore. One of the portable telephones with camera 15 is the portable telephone with camera 1 that enters the bookstore in this step.

In step S22 of FIG. 2, the user of the portable telephone with camera 1 starts up the photography mode of the camera. That is, when the user operates the operation unit 12, the control circuit 5 causes the display unit 11 to display a menu (not shown), which has a plurality of items for selecting functions, thereon. Based on the operation of the operation unit 12 by the user, the control circuit 5 selects the camera select button in the menu. The control circuit 5 changes the mode information, which indicates the current mode of the portable telephone with camera 1, to the photography mode, and stores the information in the memory 6. In the case of the portable telephone with camera 1 which is previously provided with a camera select button as the hardware, the following process is carried out. That is, when the user depresses the camera select button, the control circuit 5 detects the depression. The control circuit 5 changes the mode information into the photography mode and stores the information in the memory 6. This photography mode is a mode in which the camera is available for ordinary photography.

Figure 5:
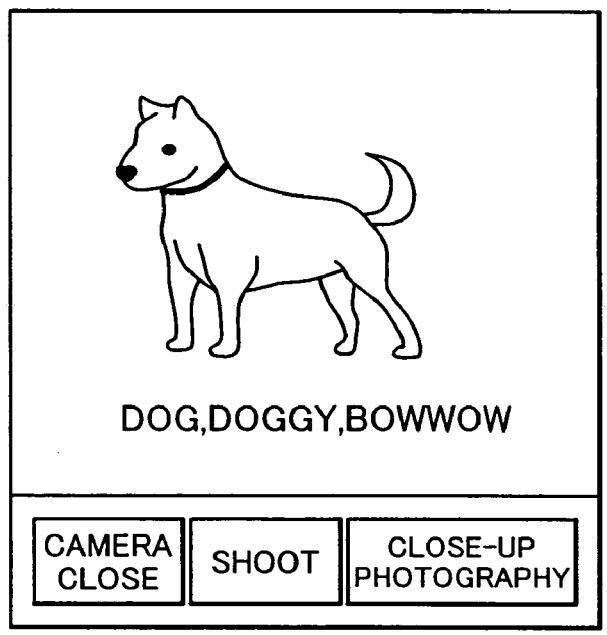
FIG. 5 shows an example of a screen at photography mode of the portable electronic device with camera in accordance with the present invention.

In this case, a screen shown in FIG. 5 (a screen, which is displayed on the display unit 11 in the photography mode in which ordinary photography is available) is displayed on the display unit 11. The image of a dog and characters "DOG, DOGGY, BONE-EATER, BOWWOW" is an example of an image of a paper surface in a book as the object to which a camera lens is directed. "SHOOT" on the menu screen is the photography button (shutter button). When the control circuit 5 detects a depression of the switch corresponding to the photography button, which is provided in the operation unit 12, the control circuit 5 recognizes that the photography button is depressed. Then, the control circuit 5 outputs the mode information indicating the current mode and a photography instruction to the camera control circuit 7. When the mode indicated by the mode information is the photography mode, the camera control circuit 7 causes the camera unit 8 to select the ordinary photography lens 10 and to carry out the photography. When the mode indicated by the mode information is the close-up photography mode, the camera control circuit 7 causes the camera unit 8 to select the close-up photography lens 9 and to carry out the photography.

On the other hand, when the close-up photography is desired, the user starts up the photography mode as described above, and changes over the mode of the portable telephone with camera 1 into the close-up photography mode as described bellow. "CLOSE UP" in the menu screen displayed in FIG. 5 is a close-up photography mode select button. The user depresses the switch, which is provided in the operation unit 12, corresponding to the close-up photography mode select button. Detecting the depression of the switch, the control circuit 5 recognizes that the close-up photography mode select button is depressed. Then, the control circuit 5 changes the mode information, which indicates the current mode of the portable telephone with camera 1, to the close-up photography mode and stores the information in the memory 6. Thereby, the portable telephone with camera 1 is set to the close-up photography mode. The user can take a close-up photograph by depressing the above-mentioned photography button when the portable telephone 1 is in the close-up photography mode. The mode can be switched to the close-up photography mode at arbitrary timing after the photography mode has been started up.

When the close-up photography mode select button is depressed during the close-up photography mode, the portable telephone 1 is set to the ordinary photography mode.

Further, to terminate the photography by the camera, the user depresses the "CAMERA CLOSE" (camera terminate button) indicated in the menu screen shown in FIG. 5 etc. That is, the switch, which is provided in the operation unit 12, corresponding to the camera terminate button, is depressed. Detecting the depression of the switch, the control circuit 5 recognizes that the camera terminate button is depressed. Then, the control circuit 5 changes the mode information, which indicates the current mode of the portable telephone with camera 1, to the ordinary portable telephone mode, and stores the information in the memory 6. Thereby, the mode of the portable telephone with camera 1 does not take the photography mode or the close-up photography mode, but takes the ordinary portable telephone mode. Thus, the communication by the telephone function, transmission and reception of e-mail and the like become available through the portable telephone. The mode can be switched to the ordinary portable telephone mode at arbitrary timing after the photography mode has been started up.

In step S23 of FIG. 2, the photography-prohibition radio wave detection circuit 4 starts detecting the photography prohibition radio waves, after the photography mode has been started up as described in step S22. When the photography prohibition radio wave detection circuit 4 does not detect the photography prohibition radio waves, the control circuit 5 determines that the portable telephone 1 is out of the photography-prohibited area 14. In this case, the close-up photography is not prohibited. Then, the process proceeds to step S26. When the photography prohibition radio wave detection circuit 4 detects the photography prohibition radio waves, the control circuit 5 determines that the portable telephone 1 is in the photography-prohibited area 14, and the process proceeds to step S24.

In this case, for example, when the photography prohibition radio wave detection circuit 4 detects the photography prohibition radio wave, and predetermined code from the detected photography prohibition radio waves, the following procedures may be executed. That is, when the predetermined code indicates, for example, a character "A", the control circuit 5 determines that the portable telephone 1 is in the photography-prohibited area 14. And in order to prohibit all photography including the ordinary photography, the control circuit 5 displays a warning sentence indicating the prohibition of all photography superimposed on the screen shown in FIG. 5 on display unit 11. Also, an "X" mark is displayed superimposed on the photography button shown in FIG. 5. While the "X" mark is displayed over the photography button, the control circuit 5 invalidates the depression of the photography button. In this state, even when the user depresses the photography button, the depression of the button is ignored. Therefore, the photography cannot be carried out. And then, the process proceeds to step S27. Also, when the predetermined code indicates, for example, a character "B", the control circuit 5 determines that the portable telephone 1 is in the photography-prohibited area 14. And in order to prohibit the close-up photography only, in the same manner as processing when the detection of the predetermined code is not done, the process proceeds to step S24.

In step S24 of FIG. 2, the control circuit 5 reads out the mode information from the memory 6, and determines whether or not the mode information is the close-up photography mode. When the mode information is not the close-up photography mode, the control circuit 5 permits the photography other than the close-up photography (in this case, ordinary photography), and the process proceeds to step S26. When the mode information is the close-up photography mode, the control circuit 5 proceeds to step S25. Here, in step S22, at arbitrary timing after the photography mode has been started up, when the user depresses the close-up photography mode select button so as to attain the shifting to the close-up photography mode, the mode information is changed to the close-up photography mode.

Figure 6:
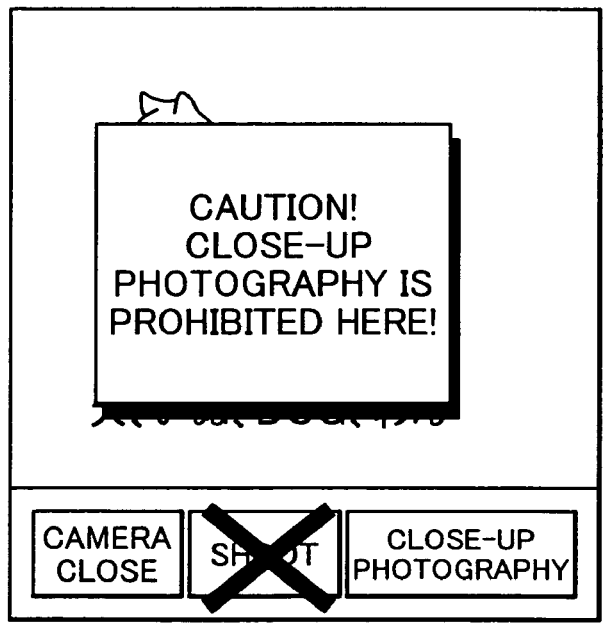
FIG. 6 shows an example of a screen when a warning is displayed.
Figure 7:
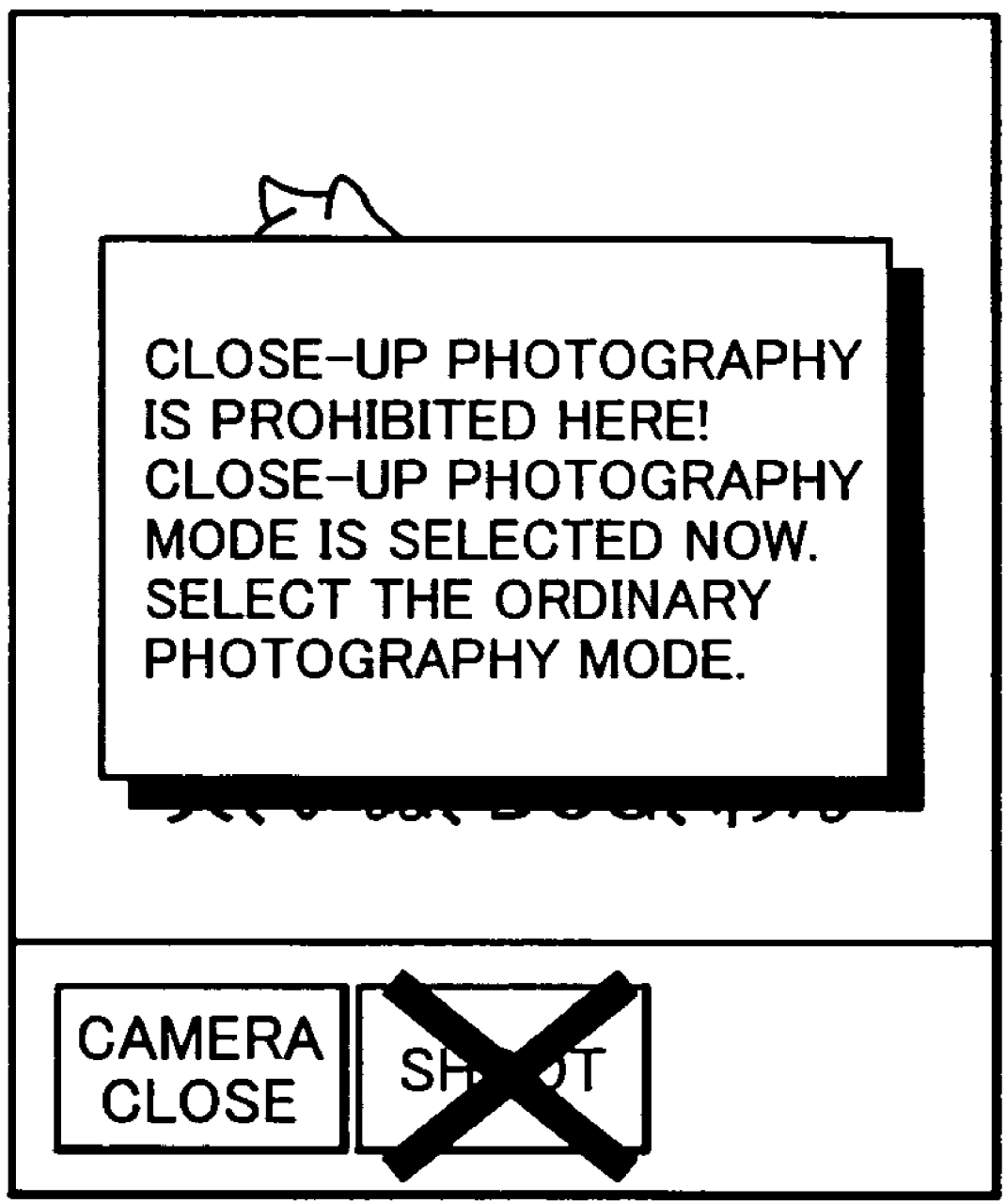
FIG. 7 shows an example of a screen when a warning is displayed.

In step S25 of FIG. 2, as shown in FIG. 6, which is an illustration of an example of the screen when a warning is displayed, the control circuit 5 displays a warning sentence on the screen in FIG. 5, and displays an "X" mark superimposed on the photography button. By this display, the control circuit 5 notifies the user that this place is within a close-up photography prohibited area; and accordingly, the "close-up photography mode", is not available. While the "X" mark is displayed over the photography button, the control circuit 5 invalidates the depression of the photography button. In this state, even when the user depresses the photography button, the depression of the button is ignored. Therefore, the close-up photography cannot be carried out.

In step S26 of FIG. 2, the control circuit 5 displays the screen for photography mode shown in FIG. 5 on the display unit 11, and permits the photography. And the process proceeds to step S27.

In step S27 of FIG. 2, the control circuit 5 reads out the mode information from the memory 6, and when the mode information is the ordinary portable telephone mode, terminates the photography by the camera. When the mode information is not the ordinary portable telephone mode, the process proceeds to step S23.

As described above, the portable telephone with camera 1 performs the switching between the photography mode and the close-up photography mode based on the depression of the close-up photography mode select button in the menu screen shown in FIG. 5. And based on this mode switching operation, the portable telephone with camera 1 performs the switching between the ordinary photography lens 10 and the close-up photography lens 9. However, some portable telephone with cameras 1 are provided with a changeover switch for camera lens on the side face or near the camera unit 8 of the portable telephone. In the portable telephone with cameras 1 of this type, the user performs the switching between the ordinary photography lens 10 and close-up photography lens 9 using the changeover switch. The control circuit 5 detects this switching operation and stores the photography mode or the close-up photography mode corresponding to the kind of the lens to the mode information of the memory 6. In the case of the portable telephone with camera 1 of this type, FIG. 7 corresponds to FIG. 6, the massage of the "WARNING" is displayed such as for example "Close-up photography is prohibited here! Close-up photography mode is selected now. Select the ordinary photography mode," or the like. Further, the menu screen has no close-up photography mode select button.

As described above, according to the first embodiment, when the close-up photography mode is selected in the photography-prohibited area 14, the warning sentence, which notifies that the close-up photography is not available, is displayed. And the depression of the photography button is ignored. Thus, not only in the case where the user sets the portable telephone with camera 1 to the close-up photography mode in the bookstore, needless to say, but also even when the user enters the bookstore after intentionally setting the mode to the close-up photography mode outside the bookstore, the close-up photography is prohibited.

Next, a second exemplary embodiment of the portable electronic device with camera according to the present invention will be described.

Figure 8:
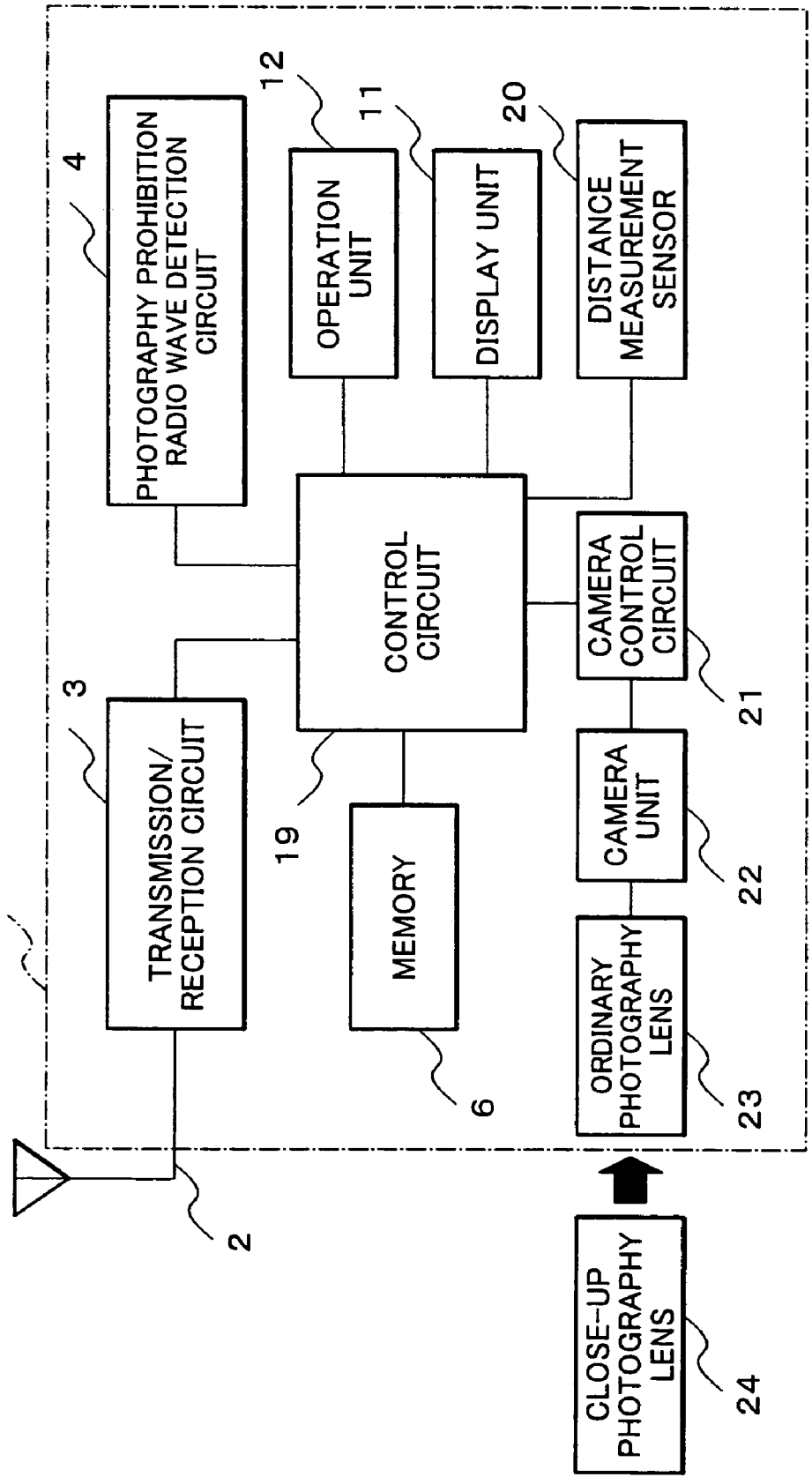
FIG. 8 is a block diagram showing a second exemplary embodiment of a portable electronic device with camera in accordance with the present invention.

FIG. 8 is a block diagram showing the second exemplary embodiment of the portable electronic device with camera according to the present invention. Hereinafter, the description will be made with reference to a portable telephone with camera 18 as an example of the portable electronic device with camera.

In FIG. 8, the same components as those in FIG. 1 will be given with the same reference numerals, and the description thereof will be omitted. Only the components different from them will be described.

A portable telephone with camera 18 of this embodiment has a basic structure including an antenna unit 2, a transmission/reception circuit 3, a control circuit 19, a memory 6, a display unit 11, an operation unit 12 and the like. Further, the portable telephone with camera 18 is provided with a photography prohibition radio wave detection circuit 4, a camera control circuit 21, a camera unit 22, a close-up photography lens 24, an ordinary photography lens 23, and a distance measuring sensor 20.

The components different from those in FIG. 1 are a distance measuring sensor 20, an ordinary photography lens 23, a close-up photography lens 24, a camera unit 22, a camera control circuit 21 and a control circuit 19.

The distance measuring sensor 20 measures the distance between the camera unit 22 and an object.

The ordinary photography lens 23 and the close-up photography lens 24 are identical in function to those in FIG. 1. However, the close-up photography lens 24 is not incorporated in the main body of the portable telephone. The close-up photography lens 24 is handled separately as an accessory. When carrying out close-up photography, the user attaches the close-up photography lens 24 to the ordinary photography lens 23 incorporated in the main body of the portable telephone.

In the first embodiment, when photographing by the camera, the control circuit 5 outputs the mode indicated by the current mode information and photography instruction to the camera control circuit 7. However, when photographing by the camera, the control circuit 19 in this embodiment outputs only the photography instruction to the camera control circuit 21. Accordingly, by receiving the photography instruction, the camera control circuit 21 in this embodiment causes the camera unit 22 to photograph the object. Thus, the camera unit 22 photographs the object.

In this embodiment, when photographing by the camera unit 22, the distance measuring sensor 20 measures the distance between the camera and an object. When the distance is within a predetermined specific distance, this photography is considered to be close-up photography. And, when the photography prohibition radio wave detection circuit 4 detects the photography prohibition radio waves, the control circuit 19 prohibits the close-up photography.

Therefore, while the photography prohibition radio wave detection circuit 4 is detecting the photography prohibition radio waves, to carry out the close-up photography, when the user brings the camera close within the predetermined specific distance with respect to the object, the control circuit 19 prohibits the close-up photography. Accordingly, the close-up photography cannot be carried out.

Next, the operation of the portable telephone with camera according to the second embodiment will be described in detail with reference to FIG. 9 to FIG. 12.

Figure 9:
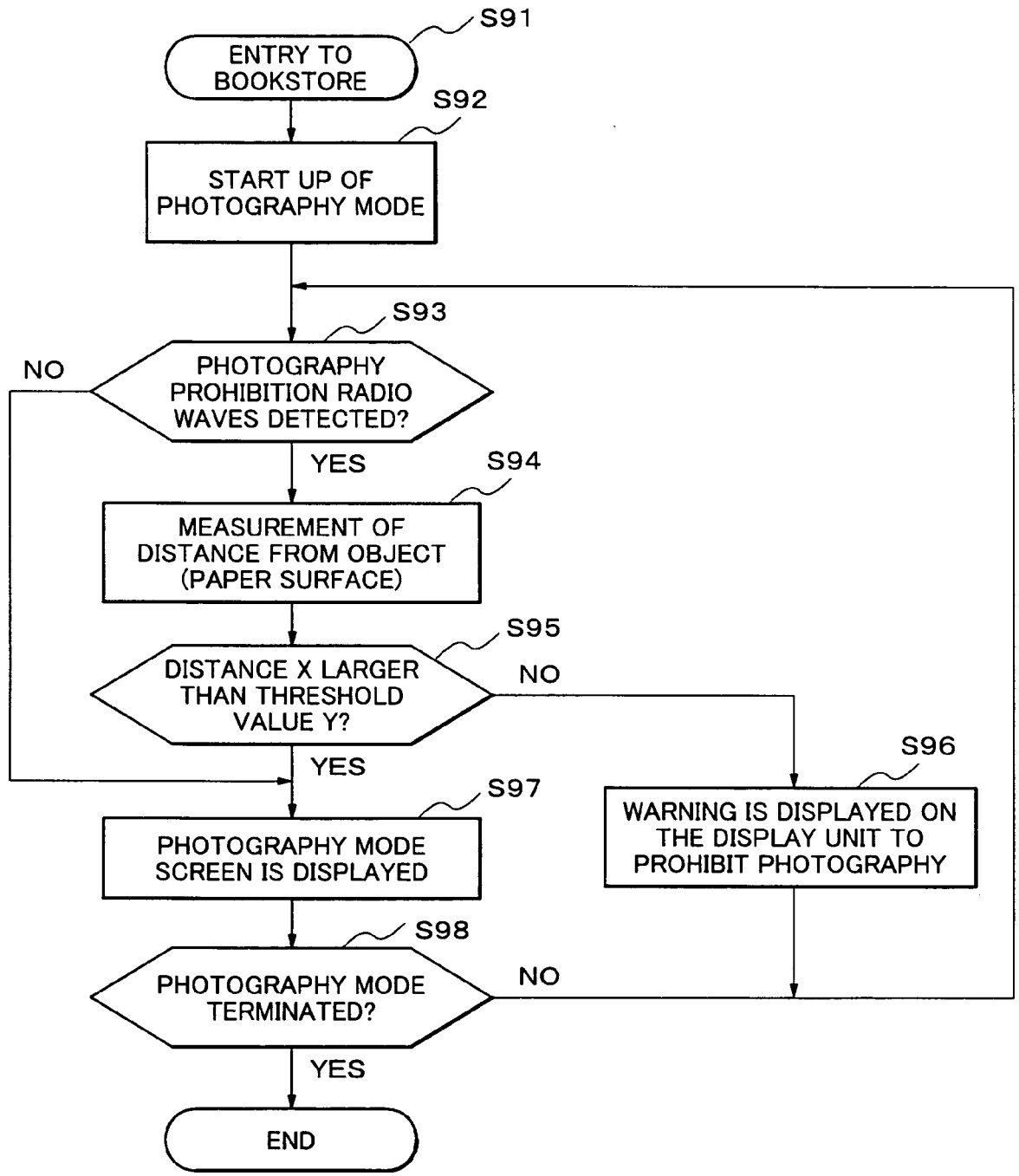
FIG. 9 is a flowchart showing an example of the operation of the second embodiment of the portable electronic device with camera in accordance with the present invention.

In step S91 of FIG. 9, a user of a portable telephone with camera 18 shown in FIG. 8 enters a bookstore. Step S91 is the identical to step S21 of FIG. 2. However, the portable telephone with camera 1 is replaced with the portable telephone with camera 18.

In step S92 of FIG. 9, the user starts up the photography mode with the camera of the portable telephone with camera 18. That is, when the user operates the operation unit 12, the control circuit 19 causes the display unit 11 to display a menu (not shown) having a plurality of items for selecting the function. In response to the operation of the operation unit 12 by the user, the control circuit 19 selects a camera select button in the menu. And the control circuit 19 sets the mode information, which indicates the current mode of the portable telephone with camera 18 to the photography mode, and stores the information in the memory 6. In the case of the portable telephone with camera 18 with which the camera select button is provided as the hardware beforehand, the following process is carried out. When the user depresses the camera select button, the control circuit 19 detects the depression. And the control circuit 19 sets the mode information indicating the current mode to the photography mode, and stores the information in the memory 6.

Thereby, the portable telephone with camera 18 takes the photography mode, and the photography by the camera becomes available.

Figure 12:
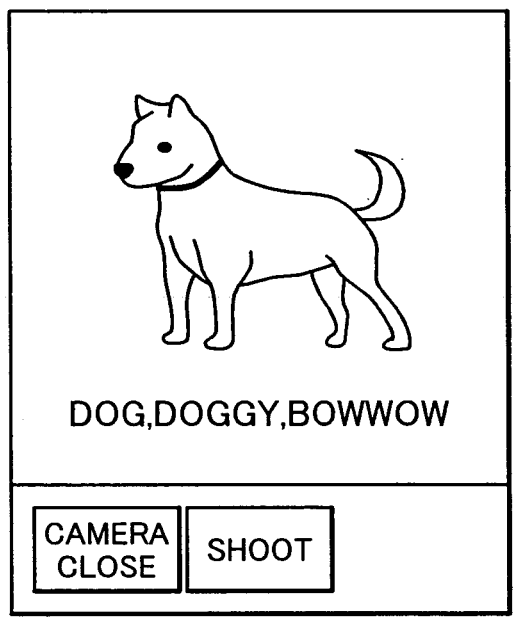
FIG. 12 shows an example of a screen at photography mode of portable electronic device with camera in accordance with the present invention.

In this case, a screen shown in FIG. 12 (a screen, which is displayed in the display unit 11 in the photography mode) is displayed on the display unit 11. The image of a dog and characters of "DOG, DOGGY, BONE-EATER, BOWWOW" are an example of the image of the paper surface of a book as an object at which the lens of the camera is directed. "SHOOT" on the menu screen is the photography button. When the control circuit 19 detects the depression of the switch, which is provided at the operation unit 12 corresponding to the photography button, the control circuit 19 recognizes that the photography button is depressed. The control circuit 19 outputs the photography instruction to the camera control circuit 21. The camera control circuit 21 causes the camera unit 22 to carry out the photography.

When desiring the close-up photography, the user attaches the close-up photography lens 24 to the ordinary photography lens 23. The close-up photography lens 24 can be attached at arbitrary timing.

To terminate the photography by the camera, the user depresses "CAMERA CLOSE" (camera terminate button) displayed in the menu screen shown in FIG. 12 etc. That is, the user depresses the switch provided at the operation unit 12, which corresponds to the camera terminate button. Detecting the depression of the switch, the control circuit 19 recognizes that the camera terminate button is depressed. And the control circuit 19 changes the mode information indicating the current mode of the portable telephone with camera 18 to the ordinary portable telephone mode, and stores the information in the memory 6. Thereby, the mode of the portable telephone with camera 18 changes to the ordinary portable telephone mode rather than the photography mode. And the communication by the telephone function, transmission and reception of e-mail and the like become available through the portable telephone. The mode can be switched to the ordinary portable telephone mode at arbitrary timing after the photography mode has started up.

In the step S93 in FIG. 9, when the photography mode is started up as shown in step S92, the photography prohibition radio wave detection circuit 4 starts detecting the photography prohibition radio waves. When the photography prohibition radio wave detection circuit 4 does not detect the photography prohibition radio waves, the control circuit 19 determines that the portable telephone 18 is out of the photography-prohibited area 14. In this case, the close-up photography is not prohibited. The process proceeds to step S97. When the photography prohibition radio wave detection circuit 4 detects the photography prohibition radio waves, the control circuit 19 determines that the portable telephone 18 is in the photography-prohibited area 14, and the process proceeds to step S94.

Here, the following arrangement may be adopted. That is, for example, when the photography prohibition radio wave detection circuit 4 detects the photography prohibition radio waves and a predetermined code is detected from the detected photography prohibition radio waves. That is, when the predetermined code indicates, for example, a character "B", the control circuit 19 determines that the portable telephone 18 is in the photography-prohibited area 14. And in order to prohibit the close-up photography only, the process proceeds to step S94. Also, when the predetermined code indicates, for example, a character "A", the control circuit 19 determines that the portable telephone 18 is in the photography-prohibited area 14. And in order to prohibit all photography including the ordinary photography, the control circuit 19 causes the display unit 11 to display a warning sentence, which indicates that all photography is prohibited, superimposed on the screen shown in FIG. 12. Also, an "X" mark is displayed overlapped with the photography button shown in FIG. 12. While the "X" mark is displayed over the photography button, the control circuit 19 invalidates the depression of the photography button. In this case, even when the user depresses the photography button, the depression of the button is ignored. Therefore, the photography can be carried out. The process proceeds to step S98.

Figure 10:
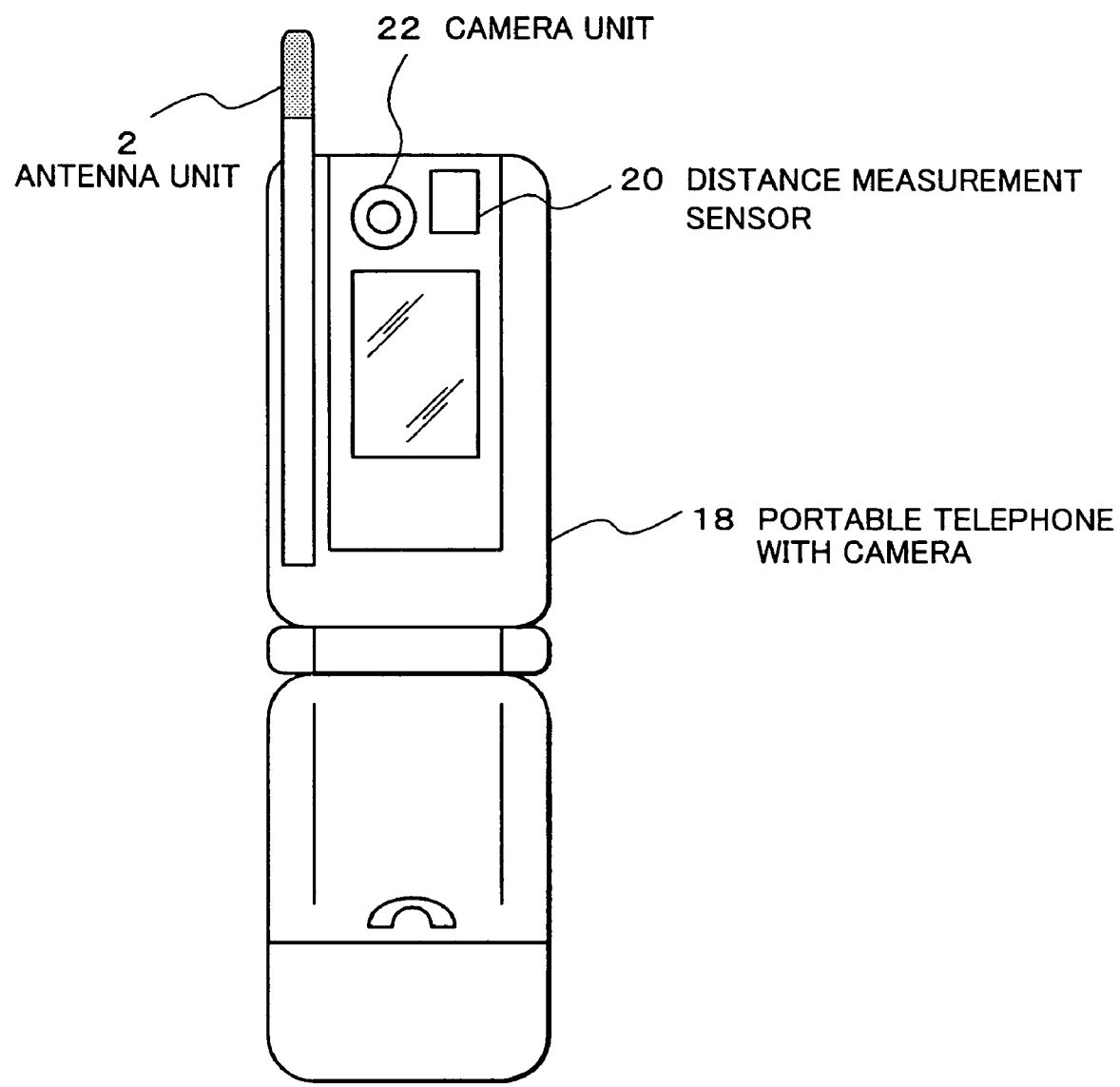
FIG. 10 shows an example of external view of a portable telephone with camera in accordance with the present invention.
Figure 11:
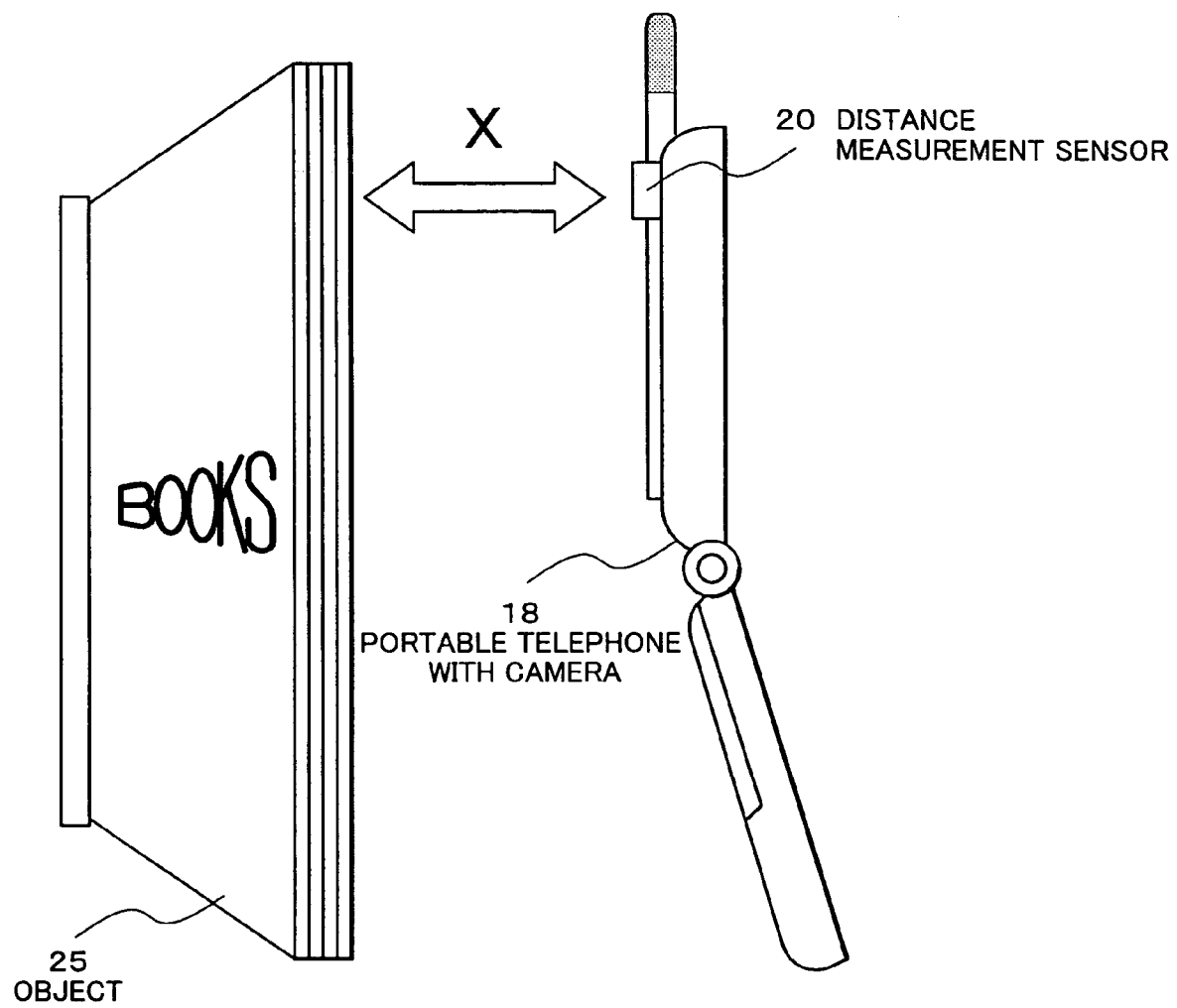
FIG. 11 shows an example of a state in which the portable telephone with camera measures a distance X between the camera unit and an object using a distance measuring sensor.

In step S94 of FIG. 9, the control circuit 19 starts up the distance measuring sensor 20 disposed beside the camera unit 22 shown in FIG. 10. FIG. 10 shows an example of the external view of the portable telephone with camera according to the present invention. FIG. 11 shows the state in which the portable telephone with camera 18 measures the distance X between the camera unit 22 and an object 25 with the distance measuring sensor 20. The distance measuring sensor 20 measures the distance X between the object 25 (paper surface of a book, magazine, etc) and the camera unit 22 as shown in FIG. 11. The distance measuring sensor 20 utilizes, for example, light source such as a laser (red semiconductor laser or the like), ultrasonic waves or the like. The distance measuring sensor 20 emits light or sound waves. And the sensor 20 measures the period of time from the point of time when the light or sound waves are emitted to a point of time when the light or sound waves that they are reflected back and returned are detected. Based on the time, the distance is obtained.

In step S95 of FIG. 9, the control circuit 19 compares the distance X measured by the distance measuring sensor 20 with the threshold value Y, which is previously set in the memory 6 (for example, a value of approximately 5 cm to 25 cm, which can be appropriately changed and set up depending on the model of the portable telephone 18). When the distance X is less than the threshold value Y, the process proceeds to step S96. When the distance X is equal to or more than the threshold value Y, the process proceeds to step S97.

Figure 13:
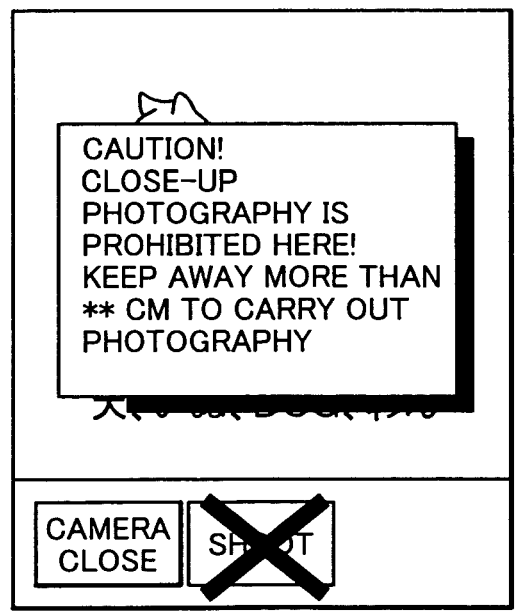
FIG. 13 shows an example of a screen when a warning is displayed.

In step S96 of FIG. 9, as shown in FIG. 13, which illustrates an example of the screen on which a warning is displayed, the control circuit 19 displays a warning sentence on the screen in FIG. 12, and displays a "X" mark superimposed on the photography button. The control circuit 19 causes the user to recognize with this display, that the portable telephone with camera 18 is in the close-up photography prohibited area, and unless the distance from the object 25 is equal to or more than threshold value Y, the photography can not be carried out. While the "X" mark is displayed over the photography button, the control circuit 19 invalidates the depression of the photography button. In this state, even when the user depresses the photography button, the depression of the button is ignored. Thus, the close-up photography cannot be carried out.

In step S97 of FIG. 9, the control circuit 19 displays the screen in the photography mode shown in FIG. 12, and permits the photography. And the process proceeds to step S98.

In step S98 of FIG. 9, the control circuit 19 reads out the mode information from the memory 6, and when the mode information is the ordinary portable telephone mode, the photography by the camera is terminated. When the mode information is not the ordinary portable telephone mode, the process continues to step S93.

As described above, according to the second embodiment, when the distance between the camera and the object 25 is within the specific distance in the photography-prohibited area 14, the warning sentence, which notifies that the close-up photography is not available, is displayed. And further, the depression of the photography button is ignored. As a result, the user cannot carry out the photography by the portable telephone with camera 18 in close distance to the object 25 in the bookstore; thus, the close-up photography can be prohibited.

As described above, according to the present invention, when the mode is the close-up photography mode in the photography-prohibited area 14, the warning sentence, which notifies that the close-up photography is not available, is displayed, and the depression of the photography button is ignored. Also, when the distance between the camera and the object 25 is within the specific distance in the photography-prohibited area 14, the warning sentence notifying that the close-up photography is not available is displayed, and the depression of the photography button is ignored. Thereby, even when the photography prohibition radio waves are emitted in the bookstore, if the camera is not in the close-up photography mode, or the distance between the camera and the object 25 is not within the specific distance, the photography is possible. Thereby, the "digital shoplifting" can be prevented while allowing the photography other than the close-up photography in the photography-prohibited area 14.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

Additionally, it is the inventor's intent to retain all equivalents of the claimed invention even if the claims are amended during prosecution.

What is claimed is:

1. A portable electronic device with camera, comprising:
    a radio wave detection circuit that detects specific radio waves, and
    a control circuit that prohibits close-up photography by said camera when said radio wave detection circuit detects said specific radio waves including a predetermined code.

2. The portable electronic device with camera according to claim 1, wherein
    when said radio wave detection circuit detects said specific radio waves, in the event that said portable electronic device is in the close-up photography mode for carrying out close-up photography by said camera, said control circuit prohibits the close-up photography.

3. The portable electronic device with camera according to claim 2, further comprising a display unit, wherein
    when said, radio wave detection circuit detects said specific radio waves, in the event that said portable electronic device is in said close-up photography mode, said control circuit displays a message indicating prohibition of the close-up photography on said display unit.

4. The portable electronic device with camera according to claim 2, wherein
    when said radio wave detection circuit detects said specific radio waves, in the event that said portable electronic device is in said close-up photography mode, said control circuit ignores a depression of a photography button provided at said portable electronic device for prohibiting photography by said camera.

5. A portable electronic device with camera, comprising:
    a radio wave detection circuit that detects specific radio waves, and
    a control circuit that prohibits close-up photography by said camera when said radio wave detection circuit detects said specific radio waves including a predetermined code,
    wherein in the event that said portable electronic device is in a close-up photography mode for carrying out close-up photography by said camera, said control circuit prohibits the close-up photography, displays a message indicating prohibition of the close-up photography on a display unit, and ignores a depression of a photography button provided at said portable electronic device for prohibiting photography by said camera and said portable electronic device further comprising an operation unit including a switch corresponding to said photography button for operating said camera and said control circuit displays said photography button on said display unit, and when detecting a depression of said switch corresponding to said photography button while said photography button is displayed on said display unit, recognizes that said photography button is depressed.

6. The portable electronic device with camera according to claim 2, wherein
    said radio wave detection circuit starts detecting of said specific radio waves from a point of time when the mode of said portable electronic device has changed to the photography mode for photographing by said camera,
    when said specific radio waves are detected after switching from said photography mode to said close-up photography mode, said control circuit prohibits the close-up photography.

7. The portable electronic device with camera according to claim 1, wherein when
    said radio wave detection circuit detects said specific radio waves, said control circuit obtains the distance between said camera of said portable electronic device and an object, and when the distance is within a predetermined distance, prohibits the close-up photography.

8. The portable electronic device with camera according to claim 7, further comprising a distance measuring sensor that measures said distance between said camera of said portable electronic device and an object.

9. The portable electronic device with camera according to claim 7, further comprising a display unit, wherein
    when said distance between said camera and said object is within a predetermined distance, said control circuit displays a message indicating the prohibition of close-up photography on said display unit.

10. The portable electronic device with camera according to claim 7, wherein when
    said distance between said camera and said object is within a predetermined distance, said control circuit prohibits a depression of a photography button provided at said portable electronic device for photographing by said camera.

11. The portable electronic device with camera according to claim 10, further comprising an operation unit including a switch corresponding to said photography button for operating said portable electronic device, wherein
    said control circuit displays said photography button on said display unit, and when detecting a depression of said switch corresponding to said photography button while said photography button is displayed on said display unit, recognizes that said photography button is depressed.

12. The portable electronic device with camera according to claim 7, wherein said radio wave detection circuit starts detecting of said specific radio waves from a point of time when the mode of said portable electronic device has changed to the photography mode for photographing by said camera.

13. A method of preventing close-up photography by using a portable electronic device with camera, comprising:
   detecting specific radio waves, and
   prohibiting close-up photography by said camera when said specific radio waves including said predetermined code are detected.

14. The method of preventing close-up photography by using a portable electronic device with camera according to claim 13, comprising:
   when said specific radio waves are detected, in the event that said portable electronic device is in the close-up photography mode for carrying out close-up photography by said camera, prohibiting the close-up photography.

15. The method of preventing close-up photography by using a portable electronic device with camera according to claim 14, further comprising:
   when said specific radio waves are detected, in the event that said portable electronic device is in said close-up photography mode, displaying a message indicating prohibition of the close-up photography.

16. The method of preventing close-up photography by using a portable electronic device with camera according to claim 14, further comprising:
   when said specific radio waves are detected, in the event that said portable electronic device is in said close-up photography mode, ignoring a depression of a photography button provided at said portable electronic device for photographing by said camera.

17. The method of preventing close-up photography by using a portable electronic device with camera according to claim 14, comprising:
   starting detecting of said specific radio waves from a point of time when the mode of said portable electronic device has changed to the photography mode for photographing by said camera, and
   when said specific radio waves are detected after switching from said photography mode to said close-up photography mode, prohibiting the close-up photography.

18. The method of preventing close-up photography by using a portable electronic device with camera according to claim 13, further comprising:
   when said specific radio waves are detected, obtaining the distance between said camera of said portable electronic device and an object, and
   when the distance is within a predetermined distance, prohibiting the close-up photography.

19. The method of preventing close-up photography by using a portable electronic device with camera according to claim 18, further comprising:
   when said distance between said camera and said object is within a predetermined distance, displaying a message indicating the prohibition of close-up photography.

20. The method of preventing close-up photography by using a portable electronic device with camera according to claim 18, further comprising:
   when said distance between said camera and said object is within a predetermined distance, prohibiting a depression of a photography button provided at said portable electronic device for photographing by said camera.

21. The method of preventing close-up photography by using a portable electronic device with camera according to claim 18, comprising:
   starting detecting of said specific radio waves from a point of time when the mode of said portable electronic device has changed to the photography mode for photographing by said camera.

* * * * *